United States Patent [19]

Clinton

[11] Patent Number: 4,525,792
[45] Date of Patent: Jun. 25, 1985

[54] UNIDIRECTIONAL CAPACITIVE FLUID-GAUGING SYSTEMS

[75] Inventor: Peter Clinton, Winchester, England

[73] Assignee: Smiths Industries Public Limited Company, London, England

[21] Appl. No.: 474,094

[22] Filed: Mar. 10, 1983

[30] Foreign Application Priority Data

Mar. 29, 1982 [GB] United Kingdom ............... 8209169

[51] Int. Cl.$^3$ .................. G01F 23/26; H01H 35/00
[52] U.S. Cl. .................. 364/509; 73/304 C; 374/172; 307/118
[58] Field of Search .................. 73/304 C, 23 R; 340/620; 324/61 R, 61 CD; 364/509; 374/172

[56] References Cited

U.S. PATENT DOCUMENTS

| 3,783,374 | 1/1974 | Eide et al. ............... 324/60 CD |
| 3,816,811 | 6/1974 | Rudolph ................... 324/61 R |
| 3,863,147 | 1/1975 | Erath ...................... 324/61 R X |
| 3,886,447 | 5/1975 | Tanaka .................... 324/60 CD |
| 3,964,037 | 6/1976 | Lamphere ............... 73/304 C |
| 4,065,715 | 12/1977 | Jaffe et al. ............... 73/304 C X |
| 4,259,865 | 4/1981 | Myers ...................... 73/304 C |
| 4,412,450 | 11/1983 | Franz et al. ............. 73/304 C |
| 4,437,162 | 3/1984 | Kato ........................ 364/509 |
| 4,471,656 | 9/1984 | Sanders ................... 364/509 |

Primary Examiner—Daniel M. Yasich
Attorney, Agent, or Firm—Pollock, Vande Sande & Priddy

[57] ABSTRACT

A fuel-gauging system has a capacitive probe mounted in a fuel tank and supplied with an alternating voltage $V_s$ from a drive unit. The output of the probe is rectified by a diode mounted in the tank, prior to supply to a measuring unit. The voltage $V_D$ across the diode varies with temperature and is measured periodically by reducing the input voltage $V_s$ by a known factor X. The voltage $V_D$ is calculated by the measuring unit from the two output currents $I_1$ and $I_2$ produced respectively at the two different voltages $V_s$ and $V_s/X$. The capacitance and hence the depth of fluid is calculated using the known voltage $V_D$ across the diode. The drive unit has a transformer that is used to reduce the voltage periodically by switching between different tappings of its secondary windings.

9 Claims, 2 Drawing Figures

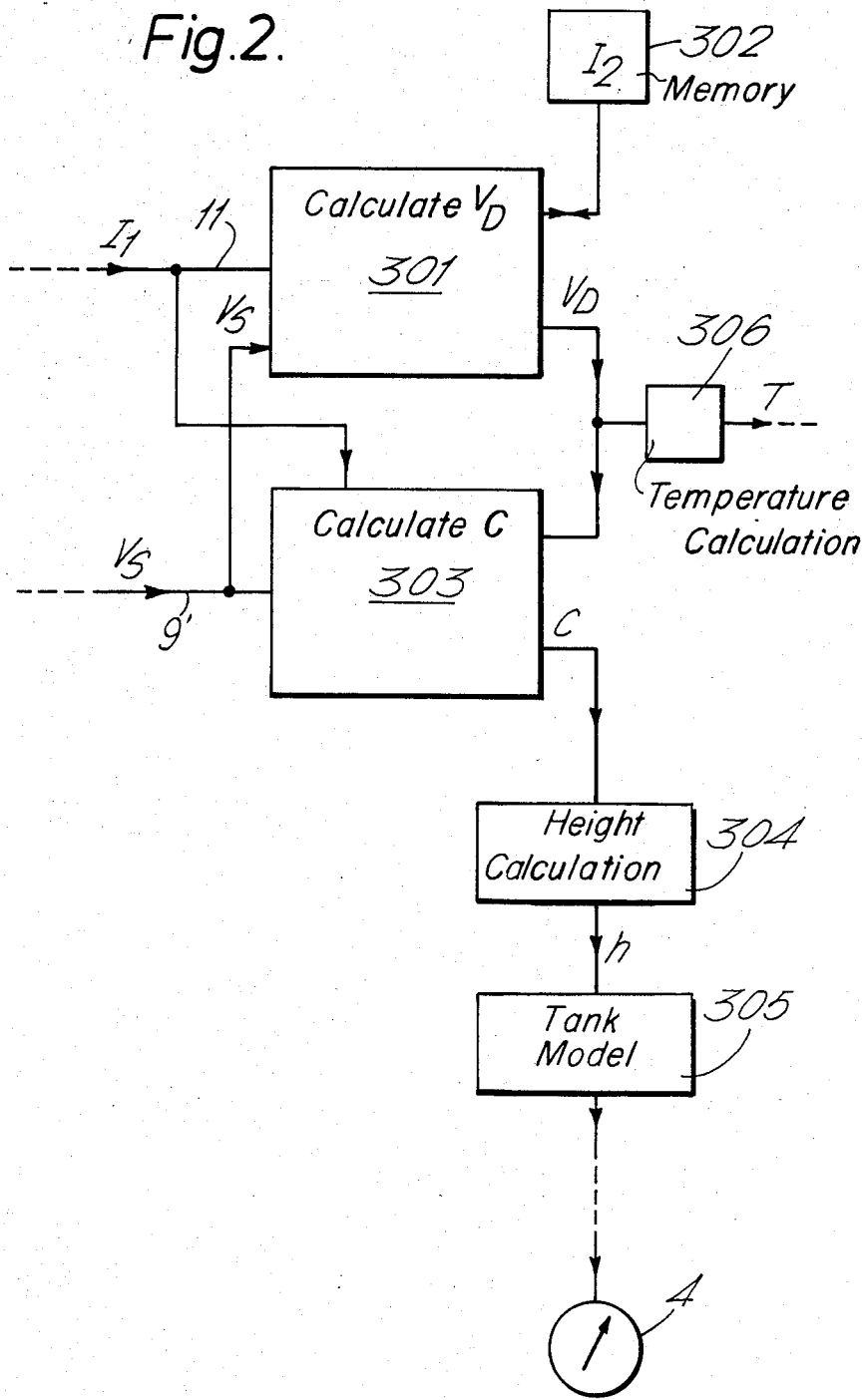

UNIDIRECTIONAL CAPACITIVE FLUID-GAUGING SYSTEMS

BACKGROUND OF THE INVENTION

This invention relates to fluid-gauging systems.

The invention is particularly concerned with capacitive gauging systems of the kind in which diodes or similar devices are connected with a capacitive sensor in a fluid tank to produce a unidirectional current output.

In capacitive fluid-gauging systems the level of fluid in a reservoir is determined by sensing changes in the value of a capacitor located within the container. The capacitor has two plates, separated by an air-gap which is filled or emptied as the depth of fluid changes, thereby altering its capacitance. An alternating electric signal is supplied to the capacitor, and its output, after rectification, is supplied to a suitable measuring circuit.

The diodes used to rectify the output of the capacitor are immersed in the fluid and are subjected to the temperature changes of the fluid. Typically, the temperature coefficient of such diodes is about −2 mV/°C. Since the voltage drop across the diodes affects the output of the capacitor sensor as supplied to the measuring circuit, it is usually necessary to compensate for this. Compensation may be achieved by use of a temperature sensor mounted close to the diodes and with knowledge of the temperature coefficient of the diodes.

This method of compensation has the disadvantage of requiring the use of additional components leading to increased complexity and reduced reliability.

BRIEF SUMMARY OF THE INVENTION

It is an object of the present invention to provide a fluid-gauging system that may be used to alleviate the disadvantages of the previous systems.

According to one aspect of the present invention there is provided a fluid-gauging system including a capacitive sensor unit adapted for immersion within a fluid, electrical supply means arranged to supply an alternating electric signal to said sensor unit such that the output of the sensor unit varies in accordance with change in fluid quantity, and a measuring unit connected to receive the output of said sensor unit, said sensor unit including a capacitor and at least one unidirectional current device connected to the output of said capacitor, said supply means being arranged to switch said signal supplied to said sensor unit between first and second predetermined values, and said measuring unit being arranged to derive an indication of the voltage across said unidirectional current device from the respective outputs of said sensor unit when said supply signal is at said first and second predetermined values.

In this way the need for additional components in and connections to the capacitive sensor unit is obviated.

The supply means may include a transformer, the alternating electric signal supplied to said sensor unit being derived from the secondary windings of said transformer, and said supply means including switching means that is arranged to switch said sensor unit between two different tappings of said secondary winding thereby changing the voltage applied to said sensor unit between first and second predetermined values. The voltage across one of said tappings may be substantially half the voltage across the other of said tappings. Switching of said supply means between said first and second predetermined values may be controlled by said measuring unit. The supply means may be arranged such that the product of the output voltage and frequency is maintained substantially constant for either one of said predetermined values. The measuring unit may include storage means that is arranged to store an indication of the value of the output from said sensor unit when the sensor unit is supplied with an input signal of one of said predetermined values.

According to another aspect of the present invention there is provided a method of deriving an indication of the voltage across a unidirectional current device in a fluid-gauging system including a capacitive sensor unit having a capacitor and at least one unidirectional current device, the method comprising the steps of supplying a first voltage to said capacitor, deriving an indication of the current output of said sensor unit at said first voltage, supplying a second voltage that is a known factor of said first voltage to said capacitor, deriving an indication of the current output of said sensor unit at said second voltage, and deriving an indication of the voltage across said unidirectional current device from knowledge of said first voltage, said factor and both said current outputs.

A fuel-gauging system, for an aircraft, in accordance with the present invention will now be described, by way of example, with reference to the accompanying drawings.

BRIEF DESCRIPTION OF THE DRAWINGS

FIG. 2 illustrates the operation of a part of the system.

DETAILED DESCRIPTION

Figure 1:
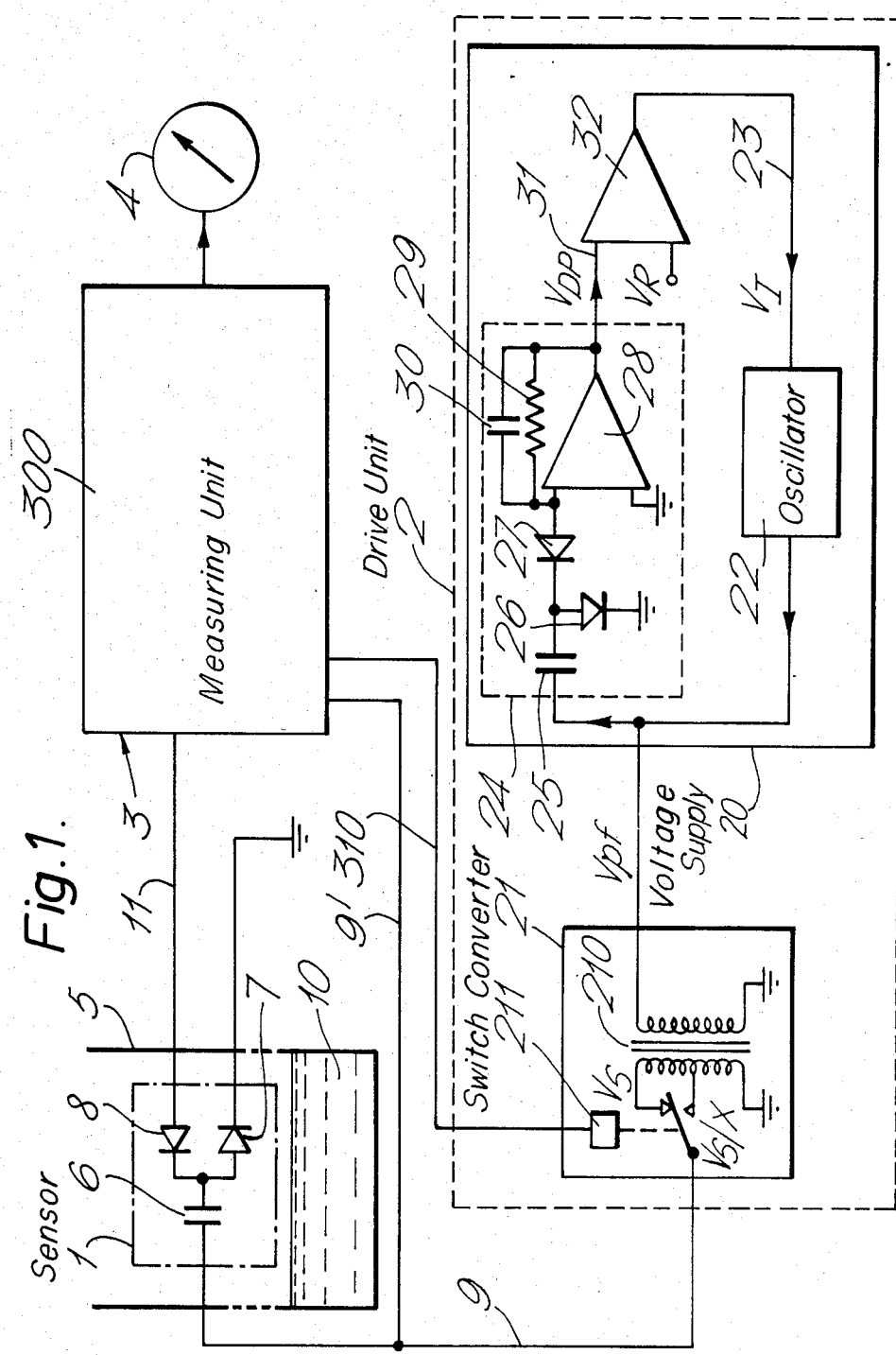
FIG. 1 shows the system schematically.

With reference to FIG. 1, the fuel-gauging system includes a capacitive sensor unit 1, a drive unit 2 that provides an alternating signal to the sensor unit 1, and a measuring unit 3 that provides a D.C. output voltage to an indicator 4 in accordance with changes in the output from the sensor unit 1.

The sensor unit 1 is mounted within an aircraft fuel tank 5 and includes a capacitor 6 which is positioned at a suitable location for immersion in any fuel 10 present within the tank. The capacitor 6 may be of the known form and have, for example, parallel plates or concentric tubes separated from one another by an air-gap which is filled with fuel to a depth dependent on the fuel level within the tank 5. As the fuel depth changes, the value of the capacitance correspondingly changes, and this change in capacitance is used to provide a mesure of the fuel depth.

The sensor unit 1 also includes two identical diodes 7 and 8, one diode 7 having its anode connected to a plate of the capacitor 6 and its cathode connected to earth, and the other diode 8 having its cathode connected to the same capacitor plate and its anode connected via line 11 to the measuring unit 3. The other plate of the capacitor 6 is connected to the drive unit 2 via line 9.

The drive unit 2 includes a voltage supply 20 and a converter 21. The supply 20 may be of the kind described in U.S. Pat. No. 4,259,865 in which the product of the output voltage and frequency is maintained constant. The supply 20 includes a sinewave oscillator 22 which has an output voltage of peak amplitude $V_P$ that is controlled by the magnitude of a D.C. voltage $V_I$ supplied to its input on line 23. The output of the oscillator 22 is supplied to the input of a diode pump circuit 24 which provides a D.C. output voltage $V_{DP}$ proportional to the product of the peak input voltage $V_P$ and its frequency f, thus $V_{DP}=V_Pf$. The diode pump circuit 24 includes a reference capacitor 25 and two diodes 26 and 27 identical to the diodes 7 and 8 in the sensor unit 1. The first diode 26 has its anode connected to one plate of the capacitor 25 and its cathode connected to earth; the second diode 27 has its cathode connected to the same plate of the capacitor 25 and its anode connected to the negative input of a current-to-voltage converter 28. The current-to-voltage converter 28 has a feedback resistor 29 and capacitor 30 in parallel across it, and has its positive input connected to earth. The output voltage $V_{DP}$ of the diode pump circuit 24 is given by the expression:

$$V_{DP}=2(V_P-V_D)fC_RR_R \quad \text{(I)}$$

where
- $C_R$ is the capacitance of the reference capacitor 25,
- $R_R$ is the resistance of the feedback resistor 29, and
- $V_D$ is the voltage drop across diode 8. The output voltage $V_{DP}$ is supplied on line 31 to one input of a voltage comparator 32, the other input of which is supplied with a reference voltage $V_R$. The voltage comparator 32 provides the input voltage $V_I$ to the oscillator 22 and functions to keep the value of its two inputs, that is, $V_{DP}$ and $V_R$, the same. As the value of $V_{DP}$ falls below that of $V_R$, the output $V_I$ is correspondingly increased, thereby causing the voltage $V_P$ at the output of the oscillator 22 to be increased, thus raising the value of $V_{DP}$ until it becomes equal to $V_R$. It can be seen therefore that, since $V_{DP}$ is proportional to f and to the value of $(V_P-V_D)$, any change in the value of $V_P$ or f, caused, for example, by fluctuations in temperature of the oscillator 22, will cause a corresponding change in the value of $V_{DP}$, and that any such change will be compensated for by adjustment of the value of $V_P$. The voltage-frequency product $(V_P-V_D)f$ will therefore be maintained constant. It will be appreciated that the supply 20 may take many different forms.

The voltage $V_P$ is applied to the converter 21 which includes a transformer 210. The voltage $V_P$ is applied to the primary windings of the transformer 210, the voltage $V_S$ developed across the secondary windings being applied to the line 9. The converter 21 also includes a switching unit 211 that can be a mechanical or solid-state switch, and that is operable to switch the line 9 to connect with a tapping of the secondary winding so that the voltage applied across line 9 is correspondingly reduced by a factor X. The switching unit 211 is controlled by signals on line 310 from the measuring unit 3.

The measuring unit 3 includes a processor 300 the operation of which is shown schematically in FIG. 2. When the switching unit 211 is in its normal position with line 9 connected across the full secondary winding, the voltage $V_S$ applied across the capacitor sensor unit 1 produces an output current $I_1$ on line 11 which is supplied to the processor 300. The current $I_1$ is given by the expression:

$$I_1=2Cf(V_S-V_O) \quad \text{(II)}$$

When the switching unit 211 connects line 9 to the reduction tapping of the transformer 210, the voltage applied across the sensor unit 1 is correspondingly reduced to $V_S/X$. The current $I_2$ supplied to the processor 300 is therefore then given by:

$$I_2 = fC2\left(\frac{V_S - V_D}{X}\right) \quad \text{(III)}$$

From expressions (II) and (III) it can be shown that:

$$V_D = \left(\frac{I_1V_S}{X} - I_2V_S\right)/(I_1 - I_2). \quad \text{(IV)}$$

Thus, providing the supply voltage $V_S$ and the factor X are known, the voltage drop $V_D$ across the diode can be calculated from the two values of current $I_1$ and $I_2$.

In FIG. 2 the calculation of $V_D$ is shown as being carried out by block 301 from the instantaneous values of $I_1$ as supplied along line 11, and the value of $I_2$ stored in memory unit 302. The value of $V_S$ is also supplied to block 301 along line 9'. Block 301 also controls the switching unit 211 by signals along line 310.

The value of the capacitor 6 is calculated using the value of $V_D$ from expression II which rearranged gives:

$$C = \frac{I_1}{2f(V_S - V_D)} \quad \text{(V)}$$

In FIG. 2 this calculation is shown as being preformed by block 303. From the value of capacitance C the height h of fluid in the tank 5 can be determined with knowledge of the manner in which the capacitance varies along the length of the probe—this is shown as being carried out by block 304.

The capacitor 6 may be characterised to the shape of the tank 5, that is, its capacitance may be arranged to vary along its length (by varying the area or spacing between the plates) so that it is linearly related to the volume of the tank. Alternatively, the processor may have stored, at 305, a model of the tank, so that volume at any height can be calculated. The processor 300 may also be arranged to provide output signals corresponding to the mass of fluid in the tank, rather than its volume, when the density of fluid is known.

The density D may be derived in the well-known way from the approximate expression:

$$D\alpha(K-1)/(1+0.4K) \quad \text{(VI)}$$

where K is the permittivity.

An indication of the temperature T of the fuel may be obtained from the known value of the voltage drop $V_D$ across the diode 8, since the temperature coefficient of the diode is known. For this purpose, the block 306 in FIG. 2 is shown as receiving the output representative of $V_D$ from block 301.

The frequency with which the value $V_D$ needs to be determined will vary with the particular application for the fluid-gauging system. Where the temperature of the fluid changes often, the value of $V_D$ will need to be determined more often. Typically, for an aircraft fuel-gauging system, $V_D$ might be determined once every minute. It can be seen therefore that the switching control unit 211 will maintain the line 9 in connection with the full tapping of the secondary winding of the transformer 210 for most of the time, with an occasional switching to the reduction tapping. In this respect, it is not important by what factor X the voltage is reduced as long as the value of the factor X is accurately known; for convenience, the secondary winding may be tapped at its mid-point so that the voltage is halved (X=2). The converter 21 need not include a transformer but could instead have a divider or other electronic reduction circuit.

The invention is not confined to use with aircraft fuel-gauging systems but could be used in other fluid-gauging systems of the kind having a rectified output.

What I claim is:

1. In a fluid-gauging system of the kind including a capacitive sensor unit adapted for immersion within a fluid, electrical supply means arranged to supply an alternating electric signal to said sensor unit such that the output of the sensor unit varies in accordance with change in fluid quantity, and a measuring unit connected to receive the output of said sensor unit, said sensor unit including a capacitor and at least one temperature-sensitive unidirectional current device connected to the output of said capacitor, the improvement wherein said supply means includes switching means, means for controlling said switching means to switch said switching means between two states in the first of which the alternating signal is supplied to said sensor unit with a peak amplitude of a first value and in the second of which the alternating signal is supplied to said sensor unit with a peak amplitude of a second value different from said first value, and wherein said measuring unit calculates the voltage across said unidirectional current device from the respective outputs of said sensor unit when said switching means is in said first state and when said switching means is in said second state.

2. A fluid-gauging system according to claim 1, wherein said unidirectional current device is a diode.

3. A fluid-gauging system according to claim 1, wherein said supply means includes a transformer having primary and secondary windings, wherein said secondary windings have two different tappings, and wherein said supply means includes switching means arranged to switch said sensor unit between said tappings of said secondary winding thereby changing the voltage applied to said sensor unit between first and second predetermined values.

4. A fluid-gauging system according to claim 3, wherein the voltage across one of said tappings is substantially half the voltage across the other of said tappings.

5. A fluid-gauging system according to claim 1, wherein said system includes means connecting said measuring unit to control switching of said switching means.

6. A fluid-gauging system according to claim 1, wherein said supply means includes means to maintain the product of the output voltage and frequency substantially constant for either one of said predetermined values.

7. A fluid-gauging system according to claim 1, wherein said measuring unit includes storage means, said storage means being arranged to store an indication of the value of the output from said sensor unit when the sensor unit is supplied with an input signal of one of said predetermined values.

8. A fluid-gauging system comprising: a capacitive sensor unit including a capacitor and a temperature-sensitive diode connected in series with said capacitor; means mounting said sensor unit for immersion in a fluid; electrical supply means that generates an alternating output voltage, said supply means including voltage switching means that is switchable between two states in the first of which the alternating output voltage has a peak amplitude of a first value and in the second of which the alternating output voltage has a peak amplitude of a second value; means connecting said supply means to said sensor unit so that voltage at said first or second value is applied to said sensor unit; measuring means; means connecting said measuring means to receive an output from said sensor unit; and means connecting said measuring means to said voltage switching means so as to control switching thereof, said measuring means calculating the voltage across said diode from the respective output currents of said sensor unit when the said output voltage of said supply means is at said first and second predetermined values, and said measuring means calculating the value of capacitance of said capacitor using the said indication of voltage across said diode.

9. In a fluid-gauging system of the kind including a capacitive sensor unit having a capacitor and at least one temperature-sensitive unidirectional current device connected to the output of said capacitor, a method of calculating the voltage across said unidirectional current device comprising the steps of: supplying an alternating signal having a first peak voltage to said capacitor; measuring the current output of said sensor unit at said first voltage; supplying an alternating signal having a second peak voltage that is a predetermined factor of said first voltage to said capacitor; measuring the current output of said sensor unit at said second voltage; and calculating the voltage across said unidirectional current device from said first voltage, said predetermined factor and both said current outputs calculating the value of capacitance of said capacitor; and calculating the quantity of fluid from said value of capacitance.

* * * * *